3,314,537
TREATMENT OF PHOSPHATE ROCK SLIMES
Ernest W. Greene, Westfield, and James B. Duke, Metuchen, N.J., assignors to Minerals & Chemicals Philipp Corporation, Woodbridge Township, N.J., a corporation of Maryland
No Drawing. Filed Nov. 23, 1964, Ser. No. 413,359
20 Claims. (Cl. 209—5)

This application is a continuation-in-part of United States patent applications Ser. No. 154,354, now abandoned, filed Nov. 22, 1961, and Ser. No. 197,604, now abandoned, filed May 25, 1962.

This invention relates to the treatment of phosphate rock slimes, and relates, especially, to the treatment of phosphatic slimes by froth flotation to separate selectively and recover phosphate values therein.

Phosphate-bearing matrix in domestic fields, such as those in Florida, Tennessee and Montana, contains a considerable quantity of material which is finer than 200 mesh (74 microns). Before the matrix is beneficiated for the recovery and concentration of phosphate values, as by agglomeration flotation or froth flotation, the matrix is subjected to a hydraulic washing treatment following which the washed material is screened and subjected to hydraulic classification. During the washing treatment, extremely finely divided material originally in the matrix remains in suspension in the water, this producing the so-called "phosphatic slime."

The slimed phosphatic ores have an appreciable phosphate content and typically analyze about 20% to 35% BPL (bone phosphate of lime or $Ca_3(PO_4)_2$). The phosphate values, however, are considerably too low to permit the dried slimes to be utilized as furnace feed in the production of elemental phosphorus where a material analyzing at least 55%, and usually 60%, is generally required. Likewise, the BPL content of the slimes is too low for the slimes to be used in fertilizer manufacture where a BPL content of at least about 65% is usually demanded. Thus, phosphatic slimes are a waste material whose production is inherent in most phosphate mining operations. If the slimes were to represent only a small portion of the total rock matrix, the fact that the slimes are apparently useless would not be of serious consequence. However, slimes usually account for a substantial portion of the phosphate rock ore that is mined, typically accounting for 30%, and usually more, of the total BPL value of the matrix. Therefore, a considerable portion of the mined rock is wasted, contributing to depletion of mine reserves. Commercially feasible processes have yet to be devised for processing slimes to recover and concentrate their phosphate values. The supply of potentially available but wasted phosphate values in the form of slimes increases annually, while the supply of phosphate ore reserves decreases.

There is still another aspect to the problem of phosphate slimes—the actual physical disposal of the enormous volume of slimes resulting from the exploration of phosphate ore deposits. With increasing build-up of slime ponds, the problem becomes an increasingly serious matter. So pressing is the problem that some phosphate rock mining operations in Tennessee are reported to be limited in output merely by their inability to dispose of the large volume of slimed waste by-product.

Considerable thought has been given in the past to the problem of recovering at least some of the phosphate values in phosphatic slimes. In fact, of such national interest is the slime problem, that it was extensively taken up by a government and industry panel which reported on its findings and recommendations in a publication by P. M. Tyler and W. H. Waggman entitled, "Report on Possible Utilization of Phosphate Rock Slimes," published by the National Academy of Sciences, National Research Council, June 29, 1953. While various general techniques for coping with the slimes and for beneficiating slimes were taken up, none of the approaches has been successful and the slimes continue to be treated as a troublesome waste material. Froth flotation was one of the many possible beneficiation processes which was considered by the panel and reported upon in the aforementioned publication of the National Academy of Sciences. However, it was recognized that slimed phosphatic ore, as other extremely finely divided materials containing colloidal particles, are not considered to be amenable to usual froth flotation techniques and, in fact, impair phosphate flotation when present in the flotation feed. Therefore, the concentration of phosphate values in the slimes was considered to be a doubtful prospect without at least initial selective flocculation of the colloids in the slimes or without the development of highly specialized reagents and/or preconcentration techniques.

We have made the surprising and unexpected discovery that a particular type of phosphatic slime; namely, the type of phosphatic slime that is obtained from Tennessee phosphate rock ore and from Western phosphate rock ore, can be simply and economically beneficiated to produce a good yield of phosphate enriched concentrate by a procedure hereinafter described.

An object of this invention is the provision of a method for processing slimes from Tennessee and Western phosphate rock to obtain good yields of a material containing sufficient phosphate values to be of potential commercial use.

A more particular object of this invention is the provision of such a method which requires the use of inexpensive conventional reagents and available equipment.

A more specific object of this invention is to provide a method for producing a slimed product having a BPL value of at least 50% from low grade Tennessee or Western phosphate rock slimes at an excellent recovery.

Yet another object of this invention is the provision of a method for reducing the volume of by-product slimes obtained in mining Tennessee or Western rock phosphate by efficient removal therefrom of a considerable portion of the phosphate values.

A specific object of this invention is the provision of a method for concentrating phosphate values in Tennessee or Western slimes by a preliminary pretreatment of the slimes to render them amenable to froth flotation followed by simple negative-ion froth flotation to obtain a phosphate rich concentrate.

Stated briefly, in accordance with this invention, a good recovery of a phosphatic concentrate is produced from Tennessee or Western phosphate slimes by the following essential steps:

(1) Slimes obtained by hydraulic washing of the phosphate rock ore, and consisting of particles substantially all of which are finer than 325 mesh (Tyler) and containing a major weight proportion of particles finer than about 10 microns, are preconditioned for froth flotation by agitating the aqueous slimes with a deflocculating agent, thereby to produce a deflocculated aqueous slip or suspension of the finely divided slime particles.

(2) The deflocculated slimes are then conditioned for froth flotation with a higher fatty acid collector reagent, a neutral hydrocarbon oil reagent and, optionally, an oil-soluble, water-insoluble petroleum sulfonate.

(3) The deflocculated slimes, thus conditioned, are subjected to froth flotation in an alkaline circuit, thereby producing a froth product which is a concentrate of phosphate values in the slimes (principally in the form of apatite) and a tailing product which is a concentrate of aluminum and iron values, together with a clayey material and other impurities originally in the slimes. Normally, the froth product is cleaned several times by being subjected to further froth flotation to improve upon the grade of the phosphate enriched material. The phosphate recovery may be further improved by recirculating middling material from previous flotation residues.

By carrying out the procedure described above, and using the oil-soluble petroleum sulfonate reagent in accordance with one form of this invention, materials having a BPL grade of 60% have been obtained at an excellent recovery of about 55% from a starting Tennessee slime having a BPL grade of only about 34%. With Montana (Western) slimes, concentrates having BPL grades of 62% to 67% were obtained at recoveries of about 60% to 90% from a starting slime having a BPL grade of only about 26%. These results were obtained without recirculating middlings which would be expected to produce even better results in terms of recovery. By applying the predispersion step to a Montana slime which had previously been wet ground with sand by tumbling the slimes with the sand, an exceptionally rich concentrate of about 75% BPL grade was obtained at an excellent recovery of about 90%. These results were realized with a minus 325 mesh waste slime (26% BPL), the solids of which were so fine (before grinding) that 50% by weight of the particles were finer than 5.5 microns and 25% by weight were in the submicron particle size range.

Since a good proportion of the iron oxide impurity originally in the slimes reports in the tailings, the $Fe_2O_3$ content of the concentrates obtained in our process is usually appreciably less than that of the feed slime. Normally, the $Fe_2O_3$ content of the beneficiated product will be sufficiently low to permit this material to be used for electric furnace feed. Depending upon their grade, the phosphate concentrates obtained in accordance with this invention can be used as feed in the production of elemental phosphorus by the electric furnace process or they can be used in fertilizer manufacture.

Since Tennessee and Western slimes contain a substantial quantity of material in the submicron size range, considerably finer than the plus 150 mesh material usually considered to be about the finest phosphate ore that is normally amenable to froth flotation, these results were indeed startling and unexpected. This is especially true since, as mentioned, froth flotation processes for beneficiating phosphate rock invariably include a preliminary desliming step. Equally surprising is the fact that Florida phosphatic slimes which are generally similar to Tennessee and Western slimes in both composition and in particle size distribution do not respond to the beneficiation treatment described hereinabove. Thus, for example, a flotation treatment which resulted in a 59% recovery of a material of about 49% BPL grade from a Tennessee slime having a BPL grade of about 34% was found to result in only a 3.6% recovery of about 29% grade material from a Florida slime originally having a BPL grade of about 32%. In other words, there was no concentration whatsoever with the Florida slimes. The fact that different types of clay minerals are present in the slimes of different origin may account for this phenomenon.

The results with Tennessee and Western slimes are also surprising since, as brought out above, an essential step of the process of this invention is the preconditioning of diluted slimes with a deflocculating agent before froth flotation to produce an apatite concentrate. The deflocculation step would be expected to inhibit selective flotation in view of the teachings of U.S. Patent No. 2,381,514 to Donald S. Phelps. This patent discloses that deflocculating agents of the type useful in carrying out the present process have the property of accelerating the settling of suspensions of phosphate ore. Such property would be expected to hinder selective flotation, not aid flotation.

The invention will be described in further detail to contribute to a better understanding thereof.

Slimes amenable to the process of this invention are those obtained in the phosphate rock districts of Tennessee and the so-called "Western field" by hydraulic washing of the phosphate rock ore either during hydraulic mining of the ore or by a separate hydraulic classification of the ore which has been dry mined. During the hydraulic washing, fine sizes of mineral material remain suspended in the water. The aqueous suspension or slime is then removed from the sediment and the latter material is beneficiated by means known to those skilled in the art. Normally, essentially all of the solids in slimes which are the tailings produced by a hydraulic washing of Tennessee and Western phosphate matrix are finer than 400 mesh and comprise for the most part argillaceous minerals including hydrated iron oxide and fine phosphate minerals.

The Western field deposits are underground sedimentary deposits which traverse the states of Utah, Wyoming, Idaho and Montana. The characteristics and origin of these deposits, as well as the deposits in Tennessee and Florida, are described in a publication of The American Institute of Mining and Metallurgical Engineers entitled, "Industrial Minerals and Rocks, Second Edition."

Representative samples of Tennessee slimes have the following analysis after being air dried at about 220° F.

|  | Wt. percent |
|---|---|
| P (35% BPL) | 4–7 |
| $SiO_2$ | 30–45 |
| CaO | 7–17 |
| $Al_2O_3$ | 20–25 |
| $Fe_2O_3$ | 7–10 |

X-ray diffraction data indicate that the phosphate values in Tennessee slimes are in the form of the mineral apatite. The clayey constituent is amorphous to X-rays and thought to be a substituted illitic material.

In most instances, Tennessee phosphatic slimes will contain only 2% to 3% by weight of particles coarser than 325 mesh. Of the minus 325 material, an appreciable portion is colloidal. Following are particle size distribution analyses of Tennessee phosphate slimes obtained from two different commercial hydraulic washing operations. Particle size values reported therein were determined by the sedimentation procedure described in TAPPI Standards, T649 sm–54; particle size data in ranges below 0.5 micron were determined by a simple modification of the TAPPI method which involves the use of a long arm centrifuge as described in a publication by F. H. Norton and S. Speil in J. Am. Ceramic Soc., 21:89 (1938).

TYPICAL PARTICLE SIZE DISTRIBUTION OF TENNESSEE PHOSPHATIC SLIMES

| Particle Size, Microns [1] | Wt. Percent Finer Than— | |
|---|---|---|
|  | Slime No. 1 | Slime No. 2 |
| 9.00 | 91 | 83 |
| 7.50 | 85 | 79 |
| 4.50 | 81 | 77 |
| 3.25 | 79 | 74 |
| 2.25 | 75 | 71 |
| 1.60 | 72 | 68 |
| 1.15 | 68 | 63 |
| 0.80 | 63 | 59 |
| 0.58 | 59 | 55 |
| 0.40 | 53 | 53 |
| 0.28 | 47 | 52 |
| 0.20 | 43 | 37 |

[1] Equivalent Spherical Diameter.

Typical particle size distribution of apatite in slimes from commercial Tennessee phosphate washers is as follows:

APATITE DISTRIBUTION IN PHOSPHATIC SLIME

|  | Particle Size, Microns [1] | Percent Wt. | Percent BPL | Percent BPL Distribution |
|---|---|---|---|---|
| Tennessee Slimes (A) | −50 | 100 | 33 | 100 |
|  | −50+0.16 | 55 | 42 | 70 |
|  | −0.16 | 45 | 22 | 30 |
| Tennessee Slimes (B) | −50 | 100 | 23 | 100 |
|  | −50+0.21 | 64 | 28 | 78 |
|  | −0.21 | 36 | 14 | 28 |

[1] Equivalent Spherical Diameter.

Western slimes are slightly coarser than Tennessee slimes. A slime obtained from a commercial Montana phosphate washer plant which is representative of slimes obtained from the Western fields had the following particle size distribution.

PARTICLE SIZE DISTRIBUTION OF WESTERN (MONTANA) PHOSPHATIC SLIMES

| Particle size, Microns [1]: | Wt. percent, finer than |
|---|---|
| 9.0 | 59 |
| 7.0 | 52 |
| 5.5 | 50 |
| 4.0 | 45 |
| 3.0 | 40 |
| 1.5 | 30 |
| 1.0 | 24 |
| 0.5 | 15 |
| 0.3 | 10 |

[1] Equivalent spherical diameter.

In carrying out the process of the invention, a water-soluble alkaline deflocculating agent is incorporated with agitation in the slimes while the slimes are at about 6% to 18% solids. The deflocculating agent may be incorporated as a solid or in the form of an aqueous solution containing sufficient water to dilute the slimed feed to the proper solids content. The incorporation of the deflocculating agent into the slimes and agitation of the system results in a distinct decrease in the viscosity of the slimes.

It is also within the scope of this invention to employ slimes which have been obtained by a hydraulic washing in which the alkaline deflocculating agent is contained in the wash water for the purpose of controlling the washing operation to produce the desired solids content in the slimes. In present practice where deflocculating agents are not added in the washing operation, effluent slime solids in the overflow are about 4% or lower. Such slimes then would require a subsequent thickening operation to obtain the desired solids for flotation. By employing the deflocculating agent in the wash liquid, slimes at solids contents considerably higher than 4% can be produced directly.

As examples of suitable deflocculating agent may be mentioned sodium silicate, ammonium hydroxide, sodium hydroxide, potassium hydroxide, sodium carbonate and mixtures of sodium silicate with one or more of the aforementioned alkaline hydroxides.

The quantity of deflocculating agent employed does not appear to be critical provided it is sufficient to deflocculate the dilute slimes, as evidenced by a marked thinning of the slimes. Thus, for example, a 38% aqueous solution of sodium silicate has been used with good results at widely varying levels from 5 to 70 pounds per ton of slime solids. Molecularly dehydrated alkali phosphate, such as, for example, tetrasodium pyrophosphate, can also be used. However, with the molecularly dehydrated phosphates, an excess of deflocculating agent appears to be undesirable and such reagent should be limited to an amount of about 2 pounds per ton of slime solids. Ammonium hydroxide has been used as the sole deflocculant at about 13 pounds per ton of slime solids.

The pH of the deflocculated slime must be on the alkaline side, a pH within the range of about 7.5 to 9.0 being suitable.

To produce the slip of deflocculated slimes, the slime containing the deflocculating agent is agitated in any suitable vessel. The agitation time is not critical and usually agitation for about 5 minutes suffice.

The slip of deflocculated slimes is then conditioned in any suitable agitated vessel with a carboxylic negative-ion collector reagent and cooperative reagents, preferably in the form of an emulsified mixture. As examples of suitable negative-ion reagents may be mentioned higher fatty acids, such as fish oil fatty acids, oleic acid, resin acids, mixtures of higher fatty acids with resin acids (e.g., tall oil acids), soaps of the aforementioned, wood by-product fatty acids, higher sulfo-fatty acids; and salts of the aforementioned. The cooperative reagent is a neutral hydrocarbon oil such as fuel oil, kerosene, mineral oil or diesel oil. It may be beneficial to substitute an oil-soluble, water-insoluble petroleum sulfonate for a portion of neutral oil. Oil-soluble, water-insoluble petroleum sulfonates are prepared by sulfonation of suitable petroleum fractions with concentrated or fuming sulfuric acid and are commercially available in the form of solutions of the sodium, calcium, barium or ammonium salts in about an equal weight of mineral oil. These solutions may be used as the sole cooperative reagent or a mixture of the solution with additional neutral oil may be used. The oil-soluble petroleum sulfonates have a higher molecular weight than water-soluble petroleum sulfonates. Usually, the molecular weight of an oil-soluble petroleum sulfonate is at least 400.

The fatty acid collector has been used with good results in amounts of about 3 to 15 pounds per ton of slime solids.

Neutral hydrocarbon oils have been employed with good results in amounts of 8 to 12 pounds per ton of slime solids. Excellent results have been obtained with 8 to 12 pounds per ton of a 50/50 solution of petroleum sulfonate in neutral oil. During conditioning, the pH of the pulp should be adjusted to the 8.0 to 9.5 level when necessary by addition of sodium hydroxide or ammonium hydroxide.

As used herein and in the examples, all reagent quantities, unless otherwise indicated, are based on the dry weight of the slimes, the dry slime weight being the weight of the slimes after being dried to essentially constant weight at 220° F.

The conditioned pulp is subjected to aeration in any suitable cell, producing an apatite rich froth and a tailing. As in other flotation processes, product grade and efficiency of concentration will be improved by refloating the froth product. In this particular flotation process there should be an advantage in recirculating middling material from previous flotation residues.

The froth product may be flocced with a suitable flocculating reagent such as a mineral acid, e.g., sulfuric acid, or a sulfate salt of a suitable metal, e.g., alum, and dried.

In the examples which follow the slimes were obtained from commercial Tennessee and Western phosphate washer plants and are representative of slimes obtained from Tennessee and Western phosphate rocks. The analyses of all slimes and concentrates are reported on a volatile free slime basis. Only principal constituents in the slimes are reported in the analyses. With the exception of phosphorus which is reported as bone phosphate of lime (BPL), the principal constituents are reported as oxides. The weight percentages of various flotation products, such as the froth product and first machine discharge product (Mach. Disch. —1), are all reported on a volatile free (V.F.) product basis, determined by heating the products to constant weight at 1800° F. All mesh sizes refer to Tyler screen values.

Example I

In accordance with this invention, a concentrate analyzing 64.57% BPL was obtained at a 23.0% BPL weight recovery from a Tennessee phosphatic slime having a BPL content of 32.55%.

To a 250 gram sample of waste phosphatic slime from a Tennessee deposit at 8.8% solids, "O" brand sodium silicate (having a weight ratio of $SiO_2$ to $Na_2O$ of 3.22 to 1 and containing about 62% water by weight) was added in amount of 5.0 pounds of the hydrated sodium silicate per ton of slimes. The addition of deflocculant raised the pH of the slimes from 6.6 up to 7.5. The mixture was agitated for 5 minutes and the pH adjusted to 8.5 with sodium hydroxide. The slimes were pulped into a Fagergren agitator and while the agitator was in operation the following reagents were added in the order given:

| Reagents: | Lb./ton of dry slimes |
|---|---|
| $NH_4OH$ | 1.0 |
| Crude tall oil acids | 4.0 |
| Fuel oil | 12.0 |

After the reagents were added, the pulp was conditioned for 17 minutes. The pH of the conditioned slimes was 8.5 and the slime solids level was 8.1%. The reagentized pulp was transferred to a 1000 gram Minerals Separation Airflow Flotation machine and subjected to a rough flotation treatment removing a froth product for 10 minutes. The froth product was repulped in the flotation machine and refloated for 10 minutes without additional reagents. The froth product was refloated three more times. The metallurgical results are as follows:

FLOTATION OF SODIUM SILICATE DISPERSED TENNESSEE PHOSPHATE SLIMES

| Products | Percent Wt. | Percent BPL (V.F. Wt. Basis) | Percent BPL Distribution |
|---|---|---|---|
| Feed | 100.0 | 32.55 | 100.0 |
| Mach. Disch. —1 | 37.9 | 20.72 | 24.8 |
| Mach. Disch. —2 | 27.4 | 27.91 | 24.1 |
| Mach. Disch. —3 | 14.5 | 35.07 | 16.1 |
| Mach. Disch. —4 | 8.9 | 42.55 | 12.1 |
| Froth Product | 11.3 | 64.57 | 23.0 |

These data show that a 64.57% BPL grade material can be obtained from Tennessee slimes, in accordance with this invention, by simple flotation of previously deflocculated dilute Tennessee slimes. This BPL value is about 100% greater than the grade of the starting slimes.

Example II

Experiments were conducted to compare the responses of Florida phosphate slimes and Tennessee slimes to the process of this invention. Each of the slimes was separately dispersed by agitating the slime at 9% to 12% solids for about 5 minutes with "O" brand sodium silicate in amount of 5.0 pounds per ton of dry slimes. The slip was then put through a 325 mesh screen to remove coarse material. The minus 325 mesh portion of each slime was conditioned for 17 minutes with the following reagents which were added in the order given:

| Reagents: | Lb./ton of dry slimes |
|---|---|
| $NH_4OH$ | 3.0 |
| Crude tall oil acids | 4.0 |
| Fuel oil | 12.0 |

The pH of the conditioned pulp was adjusted to 8.5 by addition of NaOH. The conditioned pulp was transferred to a 1000 gram Minerals Separation Airflow Flotation machine and subjected to froth flotation. A froth product was removed for 5 to 10 minutes and this was refloated three times. The machine discharges and the final froth product were flocced with alum, filtered, dried, weighed and analyzed. The metallurgical results of the flotation of Florida and Tennessee slimes are listed in the following table:

COMPARISON OF FLOTATION OF APATITE FROM PHOSPHATIC SLIMES OF DIFFERENT ORIGIN

| | Percent Wt. | Percent BPL | Percent BPL Distribution |
|---|---|---|---|
| Florida Slimes: | | | |
| Feed | 100.0 | 31.7 | 100.0 |
| Froth Product | 8.6 | 29.3 | 3.6 |
| Tennessee Slimes: | | | |
| Feed | 100.0 | 33.8 | 100.0 |
| Froth Product | 33.4 | 48.6 | 59.2 |

These data indicate that the negative-ion flotation of sodium silicate deflocculated phosphatic slimes with one rougher concentration and three froth cleanings resulted in no concentration whatsoever with the Florida slimes while an excellent 59.2% BPL recovery of a material of 48.6% BPL grade was obtained with Tennessee slimes.

Example III

This example illustrates the exceptional improvement in product grade and recovery obtainable, in accordance with this invention, through the use of an oil-soluble petroleum sulfonate as a cooperative flotation reagent.

250 grams of the Tennessee slimes at 9.2% solids was agitated for 5 minutes with the "O" brand sodium silicate in amounts of 70 pounds per ton. The pH was 8.85. The slip was screened and to the minus 325 mesh fraction the following reagents were added in the order given:

| Reagents: | Lb./ton of dry slimes |
|---|---|
| $NH_4OH$ | 3.0 |
| Crude tall oil acids [1] | 10.7 |
| Neutral calcium Petronate [1] | 10.7 |
| Crude tall oil acids | 4.0 |

[1] Aqueous emulsion.

The neutral calcium petronate had the following analysis:

| | Percent |
|---|---|
| Calcium sulfonate complex | 41.0 |
| Sodium sulfonate | Trace |
| Mineral oil | 58.5 |
| Water | 0.5 |
| | 100.0 |
| Percent Ca in sulfonate complex | 2.85 |

The pulp was conditioned for 17 minutes. The pH of the conditioned pulp was 8.7.

The conditioned pulp was subjected to froth flotation in a 1000 gram Minerals Separation Airflow Flotation machine, removing a froth product for 10 minutes. The froth product was refloated three additional times, removing a froth product for 10 minutes on each float. The following results were obtained:

FLOTATION OF TENNESSEE SLIMES USING A PETROLEUM SULFONATE AS A COOPERATIVE REAGENT WITH CRUDE TALL OIL ACIDS

| Products | Percent Wt. | Percent BPL | Percent BPL Distribution |
|---|---|---|---|
| Feed | 100.0 | 33.8 | 100.0 |
| Mach. Disch. —1 | 26.6 | 19.8 | 15.8 |
| Mach. Disch. —2 | 20.7 | 21.4 | 13.2 |
| Mach. Disch. —3 | 13.8 | 23.3 | 9.6 |
| Mach. Disch. —4 | 8.6 | 26.5 | 6.9 |
| Froth Product | 30.3 | 60.0 | 54.5 |

These data show that over half of the bone phosphate of lime content of the feed slimes was recovered in the form of a phosphate concentrate of 60.0% BPL grade. A comparison of these data with the data in Example I for a similar process in which no petroleum sulfonate reagent was used with a similar phosphatic slime to obtain a 23.0% BPL weight recovery of 64.57% BPL grade indicates that the effect of the petroleum sulfonate is generally to improve substantially upon the BPL recovery at a similar BPL grade.

A complete analysis of the Tennessee slime feed and beneficiated froth product is given below.

|  | BPL | $Al_2O_3$ | $Fe_2O_3$ | $SiO^2$ | CaO |
|---|---|---|---|---|---|
| Analysis Wt., Percent: |  |  |  |  |  |
| Feed | 33.8 | 20.2 | 8.2 | 34.8 | 16.7 |
| Froth Product | 60.0 | 10.4 | 5.5 | 18.1 | 33.8 |
| Distribution Wt., Percent | 54.5 | 15.8 | 21.6 | 15.7 | 62.4 |

These data show that the $Fe_2O_3$ content of the slimes was reduced from 8.2% to 5.5% by the flotation treatment, indicating that the iron in the slimes was not carried by the apatite into the froth.

*Example IV*

Using the method of this invention, an exceptionally high BPL grade of 66.63% at a 43.8% recovery was obtained from the 33.8% BPL Tennessee phosphate slimes of the previous example.

The slimes at 9.0% solids were formed into a deflocculated aqueous slip by agitating them for 5 minutes with the "O" brand sodium silicate in amount of 5 pounds "O" brand per ton of slime solids. The pH of the slimes was then increased from a value of 7.0 to 8.5 by addition of sodium hydroxide. The slip was conditioned with $NH_4OH$, crude tall oil acids and fuel oil and subjected to froth flotation. The froth product was refloated five times and two of the middling machine discharges were re-reagentized and refloated.

*Example V*

Still in accordance with this invention, a concentrate analyzing 62.04% BPL was obtained at an excellent weight recovery of 87.8% from minus 325 mesh Western phosphatic slime having a calculated BPL content of 25.69%. The slimes used in the test was a sample of the 59% minus 9.0 micron Montana slimes having the particle size distribution given hereinabove.

A 250 gram sample of the waste Montana phosphatic slimes at 31.1% solids was diluted with water to 10% solids. "O" brand sodium silicate defloculating agent was added with 5 minutes agitation in amount of 5 pounds of the hydrated sodium silicate per ton of dry slimes, thereby increasing the pH from 8.0 to 8.7. The deflocculated diluted slimes were pulped into a Fagergren agitator and, while the agitator was in operation, the following reagents were added in the order given:

Reagents: Lb./ton of dry slimes
- $NH_4OH$ _____ 4.0
- Crude tall oil acids _____ 10.7
- Mixture of No. 2 fuel oil and bunker C oil ___ 10.7
- Crude tall oil acids _____ 1.2

After the reagents were added, the pulp was conditioned for 17 minutes. The pH of the conditioned slimes was about 9.1 and the slime solids level was 9.1%. The re-agentized pulp was transferred to a 1000 gram Minerals Separation Airflow Flotation machine and subjected to a rougher flotation treatment removing a froth flotation for 10 minutes. The froth product was repulped in the flotation machine and refloated for 10 minutes without additional reagents. The froth product was refloated two more times in the manner indicated. The metallurgical results are as follows:

FLOTATION OF SODIUM SILICATE DISPERSED WESTERN PHOSPHATIC SLIMES

| Products | Percent Wt. | Percent BPL | Percent BPL Distribution |
|---|---|---|---|
| Feed | 100.0 | 25.69 | 100.0 |
| Mach. Disch.—1 | 33.6 | 3.61 | 4.7 |
| Mach. Disch.—2 | 17.6 | 4.15 | 2.8 |
| Mach. Disch.—3 | 8.2 | 8.39 | 2.6 |
| Mach. Disch.—4 | 4.3 | 12.67 | 2.1 |
| Froth Product | 36.3 | 62.04 | 87.8 |

These data show that a 62.04% BPL grade material can be obtained from low grade Montana slimes, in accordance with this invention, by simple negative-ion flotation of the previously deflocculated dilute slimes. These data show that the grade of the slimes was more than doubled by the process in which only 12.2% of the BPL content of the slimes was not recovered.

*Example VI*

The process of Example V was repeated with the Montana slimes with the exception that only 5.5 lb./ton of crude tall oil acids was used instead of 10.7 lb./ton. A concentrate of 67.61% BPL grade was obtained with 5.84% weight recovery.

We claim:
1. A method for obtaining a phosphatic concentrate from aqueous slimes produced by the hydraulic washing of a material selected from the group consisting of Tennessee phosphate rock and Western phosphate rock, said slimes comprising a mixture of phosphate mineral and argillaceous minerals and consisting of particles substantially all of which are finer than 325 mesh, Tyler standard, and a major weight proportion of which is composed of particles finer than about 10 microns, which comprises:
   incorporating an alkaline deflocculating agent into said aqueous slimes with agitation so as to produce a deflocculated aqueous slip,
   conditioning said deflocculated slip for froth flotation with a fatty acid collector reagent and an oil material selected from the group consisting of fuel oil, kerosene, mineral oil and diesel oil.
   and subjecting the thus conditioned aqueous slip to froth flotation in an alkaline circuit to obtain a froth product which is a concentrate of phosphate values originally in the slimes and a tailing.

2. The method of claim 1 wherein said deflocculated slip is also conditioned with an oil-soluble, water-insoluble petroleum sulfonate.

3. The method of claim 1 wherein said deflocculaing agent is sodium silicate.

4. A method for obtaining a phosphatic concentrate from aqueous slimes produced by the hydraulic washing of a material selected from the group consisting of Tennessee phosphate rock and Western phosphate rock, said slimes comprising a mixture of phosphate mineral and argillaceous minerals and consisting of particles substantially all of which are finer than 325 mesh, Tyler standard, and a major weight proportion of which is composed of particles finer than about 10 microns, which comprises:
   agitating a deflocculating agent with said slimes at a slime solid level of about 6% to about 18% while maintaining said slimes alkaline, thereby to obtain a dilute deflocculated aqueous slip of finely divided solids present in said slimes,
   while maintaining solids in the deflocculated slip in suspension, conditioning said deflocculated aqueous slip for froth flotation with a fatty acid collector reagent and an oil material selected from the group consisting of fuel oil, kerosene, mineral oil and diesel oil.
   and subjecting the thus conditioned slip to froth flotation in an alkaline circuit thereby to obtain a froth product which is a concentrate of phosphate values in the slimes and a tailing.

5. The method of claim 4 in which said slip is also conditioned with an oil-soluble, water-insoluble petroleum sulfonate reagent.

6. The method of claim 4 in which said deflocculating agent is sodium silicate.

7. A method for treating phosphate material selected from the group consisting of Tennessee phosphate rock ore and Western phosphate rock ore to obtain a phosphatic concentrate from slimes therein which comprises:
   washing said phosphate ore with an aqueous solution of an alkaline deflocculating agent, thereby producing as an overflow deflocculated aqueous slimes comprising a mixture of phosphate mineral and argillaceous minerals,
   said slimes consisting of particles substantially all of which are finer than 325 mesh, Tyler standard, and a major weight proportion of which is composed of particles finer than about 10 microns,
   while maintaining solids in said deflocculated slimes in suspension, conditioning said deflocculated slimes for froth flotation with a fatty acid reagent and an oil material selected from the group consisting of fuel oil, kerosene, mineral oil and diesel oil.
   and subjecting the thus conditioned slimes to froth flotation in an alkaline circuit, thereby to obtain a froth product which is a concentrate of phosphate values in the slimes and a tailing.

8. A method for obtaining a phosphatic concentrate from aqueous slimes produced by the hydraulic washing of a material selected from the group consisting of Tennessee phosphate rock and Western phosphate rock, said slimes comprising a mixture of phosphate mineral and argillaceous minerals and consisting of particles substantially all of which are finer than 325 mesh, Tyler standard, and a major weight proportion of which is composed of particles finer than about 10 microns, which comprises:
   incorporating an alkaline deflocculating agent into said aqueous slimes with agitation so as to produce a deflocculated aqueous slip,
   and subjecting said deflocculated slip to froth flotation in the presence of a fatty acid collector reagent and fuel oil in an alkaline circuit to obtain a froth product which is a concentrate of phosphate values originally in the slimes and a tailing.

9. The method of claim 8 wherein said deflocculating agent is sodium silicate.

10. A method for obtaining a phosphatic concentrate from aqueous slimes produced by the hydraulic washing of a material selected from the group consisting of Tennessee phosphate rock and Western phosphate rock, said slimes comprising a mixture of phosphate mineral and argillaceous minerals and consisting of particles substantially all of which are finer than 325 mesh, Tyler standard, and a major weight proportion of which is composed of particles finer than about 10 microns, which comprises:
   agitating said aqueous slimes with sodium silicate so as to produce a deflocculated aqueous slip,
   adjusting the pH of said deflocculated aqueous slip to a value within the range of from 8.0 to 9.5,
   conditioning said deflocculated aqueous slip for froth flotation with crude tall oil acids and with an emulsified oil-soluble, water-insoluble petroleum sulfonate,
   and subjecting the thus conditioned aqueous slip to froth floatation in an alkaline circuit to obtain a froth product which is a concentrate of phosphate values originally in the slimes and a tailing.

11. A method for obtaining a phosphatic concentrate from aqueous slimes comprising a mixture of phosphate mineral and argillaceous minerals and produced by the hydraulic washing of Tennessee phosphate rock, said slimes consisting of particles substantially all of which are finer than 325 mesh, Tyler standard, and a major weight proportion of which is composed of particles finer than about 1 micron, which comprises:
   incorporating an alkaline deflocculating agent into said aqueous slimes with agitation so as to produce a deflocculated aqueous slip,
   conditioning said deflocculated slip for froth flotation with a fatty acid collector reagent and an oil material selected from the group consisting of fuel oil, kerosene, mineral oil and diesel oil,
   and subjecting the thus conditioned aqueous slip to froth flotation in an alkaline circuit to obtain a froth product which is a concentrate of phosphate values originally in the slimes and a tailing.

12. The method of claim 11 wherein a major weight proportion of the particles in said slimes is finer than about 0.4 micron.

13. A method for treating Tennessee phosphate rock to obtain a phosphatic concentrate from slimes therein which comprises:
   washing Tennessee phosphate ore with an aqueous solution of an alkaline deflocculating agent, thereby producing as an overflow deflocculated aqueous slimes comprising a mixture of phosphate mineral and argillaceous minerals,
   said slimes consisting of particles substantially all of which are finer than 325 mesh, Tyler standard, and a major weight proportion of which is composed of particles finer than about 1 micron,
   while maintaining solids in said deflocculated slimes in suspension, conditioning said deflocculated slimes for froth flotation with a fatty acid reagent and an oil material selected from the group consisting of fuel oil, kerosene, mineral oil and diesel oil,
   and subjecting the thus conditioned slimes to froth flotation in an alkaline circuit, thereby to obtain a froth product which is a concentrate of phosphate values in the slimes and a tailing.

14. A method for obtaining a phosphatic concentrate from aqueous slimes comprising a mixture of phosphate mineral and argillaceous minerals and produced by the hydraulic washing of Tennessee phosphate rock, said slimes consisting of particles substantially all of which are finer than 325 mesh, Tyler standard, and a major weight proportion of which is composed of particles finer than about 1 micron, which comprises:
   agitating said aqueous slimes with sodium silicate so as to produce a deflocculated aqueous slip,
   adjusting the pH of the deflocculated slip to a value within the range of from 8.0 to 9.5,
   conditioning said deflocculated slip with crude tall oil acids and with fuel oil,
   and subjecting the thus conditioned aqueous slip to froth flotation in an alkaline circuit to obtain a froth product which is a concentrate of phosphate values originally in the slimes and a tailing.

15. A method for obtaining a phosphatic concentrate from aqueous slimes comprising a mixture of phosphate mineral and argillaceous minerals and produced by the hydraulic washing of Tennessee phosphate rock, said slimes consisting of particles substantially all of which are finer than 325 mesh, Tyler standard, and a major weight proportion of which is composed of particles finer than about 1 micron, which comprises:
   agitating said aqueous slimes with sodium silicate so as to produce a deflocculated aqueous slip,
   adjusting the pH of said deflocculated aqueous slip to a value within the range of 8.0 to 9.5,
   conditioning said deflocculated aqueous slip for froth flotation with crude tall oil acids and with an emulsified oil-soluble, water-insoluble petroleum sulfonate,
   and subjecting the thus conditioned aqueous slip to froth floatation in an alkaline circuit to obtain a froth product which is a concentrate of phosphate values originally in the slimes and a tailing.

16. A method for obtaining a phosphatic concentrate from aqueous slimes comprising a mixture of phosphate mineral and argillaceous minerals and produced by the hydraulic washings of Western phosphate rock, said slimes consisting of particles substantially all of which are finer than 325 mesh, Tyler standard, and a major weight proportion of which is composed of particles finer than about 10 microns, which comprises:

incorporating an alkaline deflocculating agent into said aqueous slimes with agitation so as to produce a deflocculated aqueous slip, conditioning said deflocculated slip for froth flotation with a fatty acid collector reagent and an oil material selected from the group consisting of fuel oil, kerosene, mineral oil and diesel oil, and subjecting the thus conditioned aqueous slip to froth flotation in an alkaline circuit to obtain a froth product which is a concentrate of phosphate values originally in the slimes and a tailing.

17. A method for obtaining a phosphatic concentrate from aqueous slimes comprising a mixture of phosphate mineral and argillaceous minerals and resulting from the hydraulic washing of Western phosphate ore, said slimes consisting of particles substantially all of which are finer than 325 mesh, Tyler standard, and a major weight proportion of which is composed of particles finer than about 10 microns, which comprises:

agitating said slimes at a slime solid level of about 6% to about 18% with sodium silicate deflocculating agent, thereby to obtain a dilute deflocculated aqueous slip of finely divided solids present in said slimes, while maintaining solids in the deflocculated slip in suspension, conditioning said deflocculated aqueous slip for froth flotation with a fatty acid collector reagent and an oil material selected from the group consisting of fuel oil, kerosene, mineral oil and diesel oil, and subjecting the thus conditioned slip to froth flotation in an alkaline circuit thereby to obtain a froth product which is a concentrate of phosphate values in the slimes and a tailing.

18. A method for treating Western phosphate rock to obtain a phosphatic concentrate from slimes therein which comprises:

washing Western phosphate ore with an aqueous solution of an alkaline deflocculating agent, thereby producing as an overflow deflocculated aqueous slimes comprising a mixture of phosphate mineral and argillaceous minerals, said slimes consisting of particles substantially all of which are finer than 325 mesh, Tyler standard, and a major weight proportion of which is composed of particles finer than about 10 microns, while maintaining solids in said deflocculated slimes in suspension, conditioning said deflocculated slimes for froth flotation with a fatty acid reagent and an oil material selected from the group consisting of fuel oil, kerosene, mineral oil and diesel oil, and subjecting the thus conditioned slimes to froth flotation in an alkaline circuit, thereby to obtain a froth product which is a concentrate of phosphate values in the slimes and a tailing.

19. A method for obtaining a phosphatic concentrate from aqueous slimes comprising a mixture of phosphate mineral and argillaceous minerals and resulting from the hydraulic washing of Western phosphate ore, said slimes consisting of particles substantially all of which are finer than 325 mesh, Tyler standard, and a major weight proportion of which is composed of particles finer than about 10 microns, which comprises:

agitating said slimes at a slime solid level of about 6% to about 18% with sodium silicate deflocculating agent, thereby to obtain a dilute alkaline deflocculated aqueous slip of finely divided solids present in said slimes, while maintaining solids in the deflocculated slip in suspension, incorporating therein tall oil acids as a collector reagent and fuel oil as a cooperative reagent collector reagent, and subjecting said slip to froth flotation in an alkaline circuit thereby to obtain a froth product which is a concentrate of phosphate values in the slimes and a tailing.

20. A method for obtaining a phosphatic concentrate from aqueous slimes comprising a mixture of phosphate mineral and argillaceous minerals and produced by the hydraulic washing of Western phosphate rock, said slimes consisting of particles substantially all of which are finer than 325 mesh, Tyler standard, and a major weight proportion of which is composed of particles finer than about 10 microns, which comprises:

agitating said aqueous slimes with sodium silicate so as to produce a deflocculated aqueous slip, adjusting the pH of the deflocculated slip to a value within the range of from 8.0 to 9.5, conditioning said deflocculated slip with crude tall oil acids and with fuel oil, and subjecting the thus conditioned aqueous slip to froth flotation in an alkaline circuit to obtain a froth product which is a concentrate of phosphate values originally in the slimes and a tailing.

References Cited by the Examiner
UNITED STATES PATENTS

| | | | |
|---|---|---|---|
| 1,547,732 | 7/1925 | Broadridge et al. | 71—57 |
| 1,585,756 | 5/1926 | Borcherdt | 209—5 |
| 2,113,727 | 4/1938 | Hall et al. | 23—109 |
| 2,165,268 | 7/1939 | Vogel-Jorgensen | 209—166 |
| 2,303,931 | 4/1940 | Greene | 209—166 |
| 2,373,688 | 4/1945 | Keck | 209—166 |
| 2,381,514 | 8/1945 | Phelps | 209—5 |
| 2,660,303 | 11/1953 | Haseman | 209—5 |
| 2,826,301 | 3/1958 | LeBaron | 209—166 |
| 2,868,618 | 1/1959 | Oberg | 209—5 |

HARRY B. THORNTON, *Primary Examiner.*

R. HALPER, *Assistant Examiner.*